Sept. 8, 1925.  1,552,563
H. S. LABISKY
LUGGAGE CARRIER AND BODY PROTECTOR FOR MOTOR VEHICLES
Filed Oct. 18, 1923
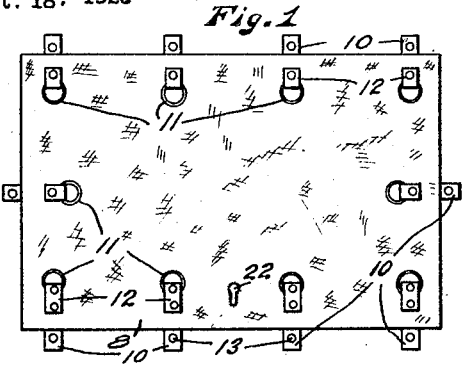
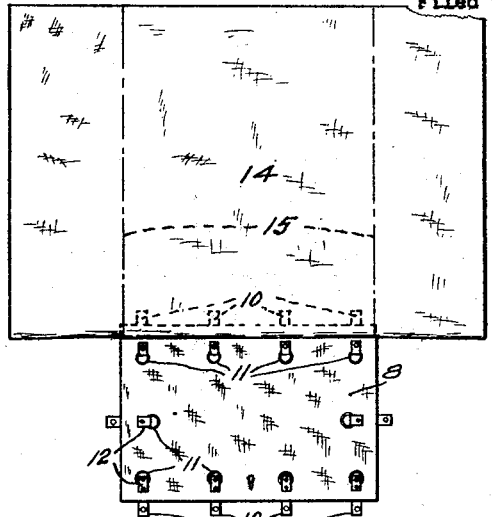
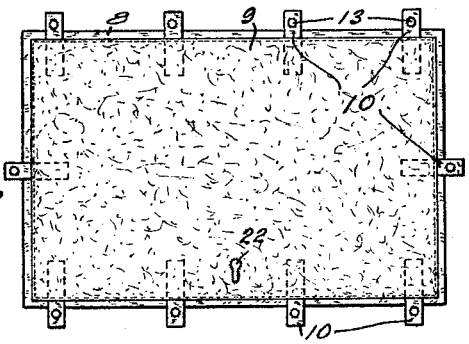
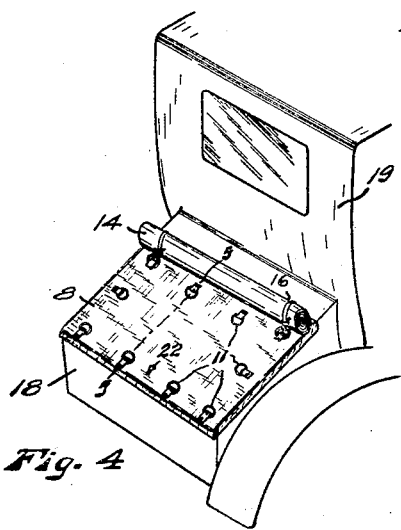
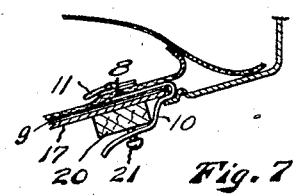
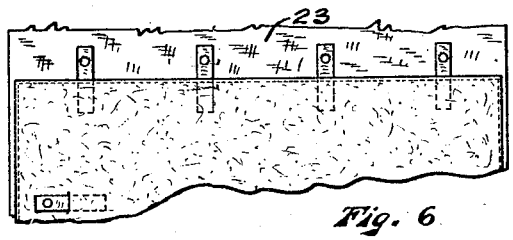
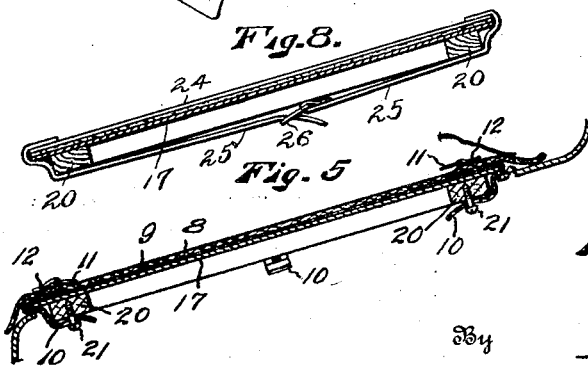
Inventor
Henry S. Labisky
By Fred C. Matheny
Attorney Patented Sept. 8, 1925.

1,552,563

UNITED STATES PATENT OFFICE.

HENRY S. LABISKY, OF SEATTLE, WASHINGTON.

LUGGAGE CARRIER AND BODY PROTECTOR FOR MOTOR VEHICLES.

Application filed October 18, 1923. Serial No. 669,323.

*To all whom it may concern:*

Be is known that I, HENRY S. LABISKY, a citizen of the United States, and a resident of Seattle, in the county of King and the State of Washington, have invented certain new and useful Improvements in Luggage Carriers and Body Protectors for Motor Vehicles, of which the following is a specification.

My invention relates to improvements in combined luggage carriers and body protectors for motor vehicles and the object of my invention is to provide a simple and efficient body protector that may be spread over and secured to the door that forms the top of the rear luggage compartment of a motor vehicle in such a manner as to protect said door and the adjacent parts of the vehicle body and form a luggage receiving device whereon luggage may be secured.

Another object is to provide a luggage carrier and door protector of this nature embodying a pad having a soft inner side arranged to be placed against a door and having strips or tabs hanging from the inner side, said strips or tab being arranged to be drawn around the edges of a door and secured to the inner surface of said door, the edges of the pad being arranged to overhand the edges of the door.

A further object is to provide a luggage carrier and door protector of this nature embodying a pad having luggage securing means on the outer side and having an apron member attached thereto that is arranged to be drawn over and to cover luggage that may be made fast to the pad.

Other and more specific objects will be apparent from the following description taken in connection with the accompanying drawings.

Before describing the invention in detail I desire to have it understood that the invention is not limited to the particular construction and arrangement of parts which I have illustrated and shall hereinafter describe and that various changes may be made in the devices shown without departing from the spirit or scope of the invention, and that the phraseology employed is for the purpose of description and not for limitation.

Motor vehicles of certain well known types are provided at the rear end of the body with a compartment having a top wall that slopes downward toward the rear end, the greater part of the area of said top wall usually being in the form of a door that is hinged at the upper edge and arranged to be swung upwardly to afford access to the compartment below. This door forms a convenient place on which to carry luggage as packs, rolls, bundles, packages and the like but is provided with a highly finished or varnished surface that is easily scratched, worn and marred if articles are carried thereon without protecting the door. My luggage carrier protects this door and makes it convenient to carry luggage thereon.

In the drawings Figure 1 is a plan view of the outer or top side of a combined luggage carrier and motor vehicle door protector constructed in accordance with my invention.

Fig. 2 is an inverted plan view showing the inner or bottom side of the same.

Fig. 3 is a plan view on a reduced scale showing the pad illustrated in Figs. 1 and 2 with an additional apron or cover member secured thereto.

Fig. 4 is a fragmentary pictorial view showing the device applied to a door on the rear end of a motor vehicle.

Fig. 5 is a sectional view, as on line 5—5 of Fig. 4 showing the manner of applying and fastening the device to a motor vehicle door.

Fig. 6 is a fragmentary view showing a pad of larger dimensions with an apron or cover member formed integral with the upper end of the same.

Fig. 7 is a fragmentary sectional view showing one way of fastening the apron member to the pad.

Fig. 8 is a sectional view showing an alternative means for securing the door protector to the door.

Like reference numerals designate like parts throughout the several views.

In Figs. 1 to 5 inclusive I show a combined luggage carrier and door protector embodying a pad formed of an outer ply or thickness 8 of coarser wear resistant and preferably water-proof material as duck or canvas and an inner thickness or lining 9 of soft nonabrasive material as cotton flannel. The soft inner member 9 may in some instances be integral with the outer member 8 but I have found it more convenient to form the pad of two different pieces of material sewed together.

The outer member 8 is preferably slightly larger than the door it is designed to cover and has a plurality of tabs or strips 10 secured thereto in such a manner as to form appendages that hang from the inner side of the pad at substantially the location of the edges of the door to which the pad is to be applied. The outer side of the pad is provided with suitable means by which luggage may be made fast to said pad as for instance with rings 11 through which tie ropes may be passed said rings being secured by strips 12 at a plurality of intervals around the edge of the pad. In some instances I may prefer to provide straps and buckles instead of the rings 11, shown.

The tabs 10 and strips 12 that hold the rings may be riveted or sewed to the heavy outer pad member 8 in any desired manner, and the tabs 10 are preferably provided with means, as with eyelets 13, by which they may be secured to the door on which the device is used.

The pads may be used in the form shown in Figs. 1 and 2, if desired, but I find it preferable to provide an apron or cover 14 of substantially the form shown in Fig. 3. This apron is preferably wider than the pad 8 and, when not in use, the sides of the same may first be folded inwardly as on the broken lines 15 and the apron may then be rolled and tied with tie straps 16 as shown in Fig. 4. The apron is preferably of lighter material than the outer portion of the pad and may be drawn over and fastened about luggage that is secured on the luggage carrier to protect the same from dirt and water. The apron may be sewed to the pad member 8 in the manner shown in Fig. 5 so that the upper end of the pad member 8 protrudes outwardly and forms a weather strip, or said apron may be secured to the pad as shown in Fig. 7 so that the end of the apron protrudes outwardly and forms a weather strip.

The device is intended for use on the doors 17 that form the top of the luggage compartments at the rear ends 18 of certain types of motor vehicles 19, such doors usually being made of sheet metal secured to wooden frames 20 and being hinged at their upper edges.

Suitable means as nails or screws 21 may be inserted in the wooden frames 20 so that the tabs 10 may be made fast thereto.

In applying this device to a door 17 the door is raised, the pad is placed on the door soft side down and the tabs 10 are drawn around the edges of the door and made fast to the screws 21 or other fastening means on the lower side of the door. The tabs at the upper edge will necessarily be inserted through the crack formed between the upper hinged edge of the door 17 and the vehicle body when the door is raised. When the door 17 is closed the tabs 10 will all be securely held between the edges of the door and the adjacent edges of the vehicle body and the pad will be firmly secured to the door. Obviously any form of snap fasteners may be used instead of the screws 21 and holes 13 in the tabs 10 for securing said tabs to the inner side of the door. I also find that the tabs will be held quite securely by the clamping effect of the door if not otherwise secured.

When the pad is on the door the edges of the pad overhang the edges of the door thus forming a waterproof covering that will prevent the entrance of water between the pad and the door.

Suitable openings may be made in the pad to afford access to the lock or latch means that holds the door as for instance a keyhole 22 may be provided in the pad.

After the pad has been secured to the door said door may be opened and closed in the usual manner without disturbing the pad regardless of whether or not luggage is fastened onto said pad.

In fastening luggage onto the pad the luggage is first securely tied to the rings 11 and may then be covered by the apron member 14 if a pad with an apron member on is being used.

When the tabs 10 are drawn around the edges of a door and fastened on the screws 21 they will be loose enough so that the perforations in the tabs may easily be passed over the heads of the screws but when the door is closed the tabs 10 will be held in the position shown and will be drawn comparatively tight.

In Figure 8 I have shown a pad 24 similar to the pads shown in Figs. 1 and 2 except that the same has long tabs 25 that project directly from the edges of the pad 24 or are secured to the top side of the pad 24 and overhang the edges of the pad said tabs 25 being drawn across the bottom side of the door and secured together as by buckles 26 so that the tabs 25 are not secured to the bottom side of the door but are secured across the bottom side of the door and serve to secure the pad 24 to the door. The pad shown in Figs. 1 and 2 may be secured to the door in a similar manner by drawing the tabs 13 around the edges of the door and securing the same, as by tieing or lacing the tabs 10 together across the bottom side of the door.

In Fig. 6 I have shown a fragmentary view of a pad which is similar to the pad shown in Figs. 1 and 2 except that a wider margin or edge outside of the fastening tabs is allowed said edge being arranged to hang down over the edge of the motor vehicle body on which the pad is placed to prevent dirt and water from getting under the pad. In Fig. 6 I also show an apron portion 23 that is formed integral with, and is of the same width as the pad instead of being a separate piece wider than the pad sewed onto the pad as shown in Fig. 3.

The foregoing description and accompanying drawings clearly disclose what I now consider to be a preferred form of the invention, but, it will be understood that this disclosure is merely illustrative and that such changes in the device may be resorted to as are within the scope and spirit of the following claims.

I claim:—

1. A door protecting device of the class described embodying a flexible pad arranged to be placed on a door with its edges overlapping the edges of the door and flexible means fastened to said pad inwardly from the edges thereof, and arranged to be drawn around the edges of the door to secure said pad to said door.

2. A door protecting device embodying a flexible pad having a soft inner surface arranged to be placed against a door and means on the inner side of said pad arranged to be drawn around the edges of a door to secure said pad to said door the edges of said pad being arranged to project over the edges of said door.

3. A protector for the door of the rear luggage compartment of a motor vehicle embodying a flexible pad having a soft inner surface arranged to be placed against said door and securing means attached to and hanging from the inner side of said pad adjacent the location of the edges of the door and arranged to be drawn around the edges of said door, the edges of said pad being free to overlap the edges of said door.

4. In a device of the class described, the combination with a door, of a flexible pad having a soft inner surface arranged to be placed against the outer side of said door, tabs appended to the inner side of said pad adjacent the location of the edges of said door and arranged to be drawn around the edges of said door said tabs having fastening means and devices on the inner side of said door to which said tabs may be secured, the edges of said pad being arranged to overlap the edges of said door.

5. A luggage carrier and door protector, embodying a flexible pad having a soft inner surface arranged to be placed against a door, appendages on the inner side of said pad arranged to be drawn around the edges of, and secured to said door, the edges of said pad being arranged to overlap the edges of said door and luggage fastening means on the exterior of said pad.

6. A luggage carrier and door protector, embodying a pad arranged to be secured to the exterior of a door to protect the same and an apron member appended to said pad and arranged to be drawn over luggage that is carried on said pad.

7. In a luggage carrier and door protector of the class described, a flexible pad having a soft inner surface arranged to be placed against a door, means for securing said pad to door, luggage fastening means on the exterior of said pad and an apron member appended to said pad and arranged to serve as a covering for luggage that is carried on said pad.

Seattle, Washington, October 8th, 1923.

HENRY S. LABISKY.